July 3, 1956 P. M. MAZUR 2,752,885
SELF-FEEDING STRUCTURES FOR ANIMAL FOODSTUFFS
Filed March 9, 1955 3 Sheets-Sheet 1
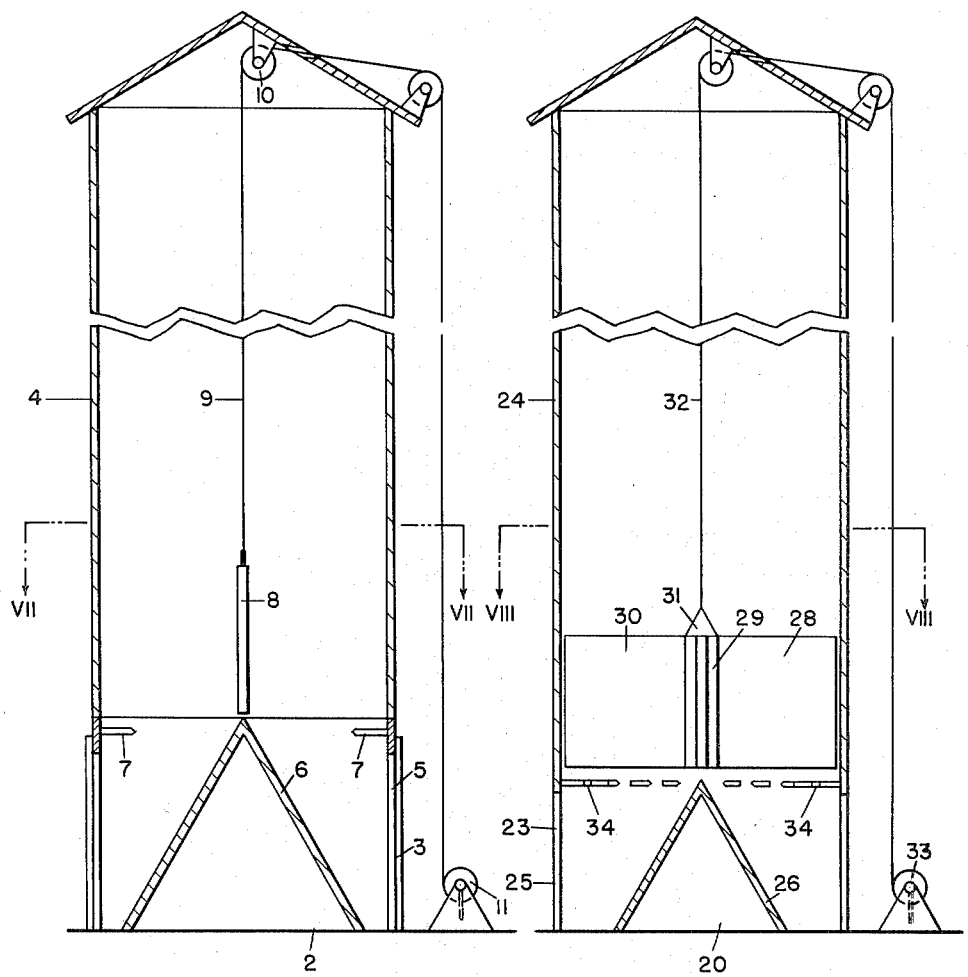
INVENTOR.
Paul M. Mazur
BY Herman Seid
atty.

July 3, 1956 P. M. MAZUR 2,752,885
SELF-FEEDING STRUCTURES FOR ANIMAL FOODSTUFFS
Filed March 9, 1955 3 Sheets-Sheet 2

INVENTOR.
Paul M. Mazur
BY Herman Seid
atty.

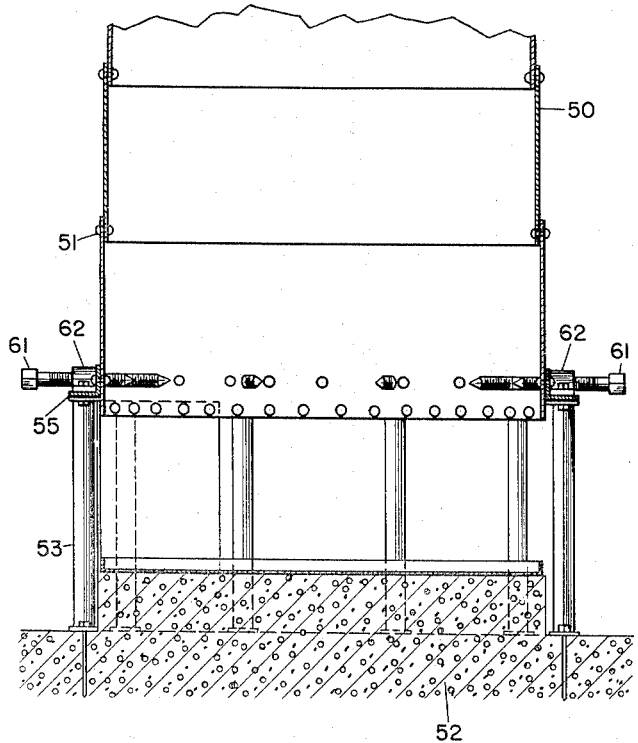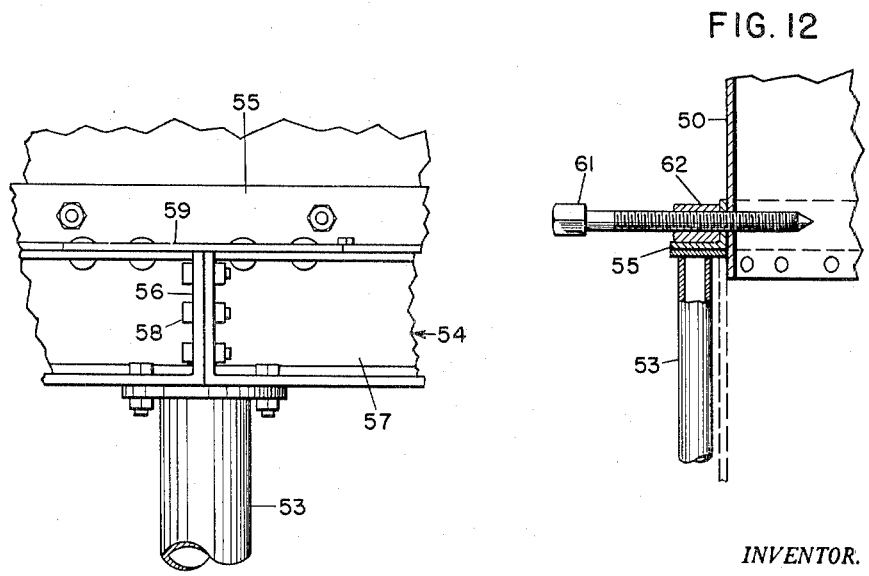

United States Patent Office 2,752,885
Patented July 3, 1956

2,752,885

SELF-FEEDING STRUCTURES FOR ANIMAL FOODSTUFFS

Paul M. Mazur, Titusville, N. J.

Application March 9, 1955, Serial No. 493,263

4 Claims. (Cl. 119—52)

This application is a continuation in part of my application, Serial No. 342,589, filed March 16, 1953, entitled "Self-Feeding Structures for Animal Foodstuffs" and relates to self-feeding structures for animal foodstuffs and more particularly to a self-feeding silo in which the masses of silage are packed in such manner as to form separate or cleavage segments, with a vertical line of demarcation between segments, to assure movement of the silage downward in the silo as the lower portion of the silage is consumed by feeding animals to automatically replenish the food supply within the reach of the feeding animal without danger of injury to the animal.

In forming silage, customary practice is to fill the silo with foodstuff such as grass, alfalfa, etc. alone or mixed with corn meal, molasses or other materials. Usually, such silage is pitchforked from the top of the mass. Attempts have been made to self-feed the animals from a silo thus eliminating the use of farm labor to feed the animals. A great disadvantage, however, in attempting to self-feed animals from a silo resides in the fact that the heavy, entwined, sticky mass adheres together and fails to fall automatically within the silo within the reach of the animal. This prevents self-feeding, of course, since the only way to place the silage within reach of the animal is to use farm labor to break the mass in small portions by pitchforks or picks. Due to these disadvantages, self-feeding silos have not been employed to any substantial extent.

The chief object of the present invention is to provide a structure containing foodstuffs so separated that they are supplied automatically to a feeding animal without danger of injury to the animal.

An object of the present invention is to provide a self-feeding silo in which the silage is packed in such manner that a line of cleavage between adjacent portions of silage is produced, permitting easy and ready downward movement of the segments automatically as the lower portions thereof are consumed by feeding animals without danger of injury to the animals.

A further object is to provide a self-feeding silo containing a vertically movable partition member which forms the silage into separate, non-interlaced masses as the silo is filled.

A still further object is to provide a self-feeding silo containing silage supporting means such as splines, which serve to support spaced masses of silage and assist in guiding the masses within easy reach of the feeding animals without danger of injury to the feeding animals or wastage.

A still further object is to provide a simple and effective method of unloading silage. Other objects of the invention will be readily perceived from the following description.

This invention relates to a self-feeding structure for animal foodstuffs which comprises, in combination, a storage chamber, a movable partition member dividing the storage chamber in segments to separate heavy masses of foodstuffs packed in the chamber, and means for raising the partition member to provide cleavage between adjacent non-interlaced masses within the chamber.

This invention further relates to a method of filling a silo with silage in which the steps consist in placing a vertically movable partition member in the storage chamber of a silo, filling the spaces separated by the partition member with silage, raising said member to form masses of silage in the storage chamber separated by a vertical line of cleavage, adding silage to the separate masses present in the chamber, again raising said member thereby cleaving the added masses, and repeating the process until the silo is substantially filled.

The attached drawings illustrate a preferred embodiment of the invention, in which Figure 1 is a sectional view of my self-feeding silo which I call a "tower on the square";

Figure 2 is a sectional view of a modified silo;

Figure 7 is a sectional view taken on the line VII—VII of Figure 1 and illustrating the spline support members;

Figure 8 is a sectional view taken on the line VIII—VIII of Figure 2;

Figure 11 is a vertical section of a silo, showing an embodiment of the invention in which adjustable screws are employed as the control means;

Figure 12 is an enlarged detail view of the control means shown in Figure 11; and Figure 13 is an enlarged fragmentary elevation showing the attachment of the body of the silo shown in Figure 11, to the supporting posts.

Figure 5:
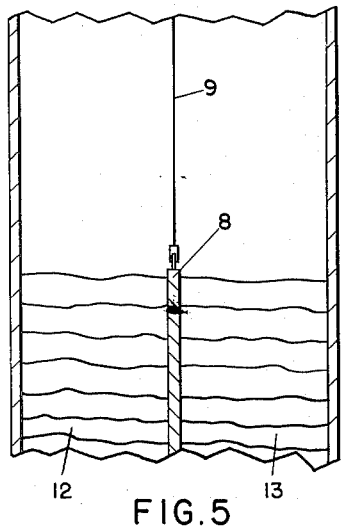
Figure 5 is a sectional view of a portion of a silo illustrating the manner in which the silo is filled.

Referring to the drawings, there is shown the self-feeding silo of the present invention which I term a "tower on the square." The silo includes a concrete base or floor 2 on which is placed a hollow base portion 3 having the general contour of a parallelepiped. Preferably, base portion 3 is formed of concrete blocks to assure adequate support for the silage when the silo is filled. A hollow, cylindrical storage chamber 4 is mounted on base 3 and extends upward therefrom. Preferably chamber 4 is formed of wood so as to be resistant to the acids of the silage; if desired, chamber 4 may be constructed of steel, concrete, tile, etc.

Base 3 is provided with openings 5 through which feeding animals may have access to the stored silage. Spaced stanchions or self-feeding gates (not shown) are employed to prevent the animal entering the silo. These gates may be of the type disclosed and claimed in Patent No. 2,626,591, granted January 27, 1953.

Extending across the base 3 centrally thereof is a dividing member 6 made of any suitable material which directs silage toward the openings 4 in the base. Silage control means such as splines or spikes 7 may extend through the walls of base 3 to support silage in chamber 4 if desired, the splines 7 preventing compaction and wastage or a mass of silage falling upon a feeding animal and directing the silage toward divider 6.

Figure 3:
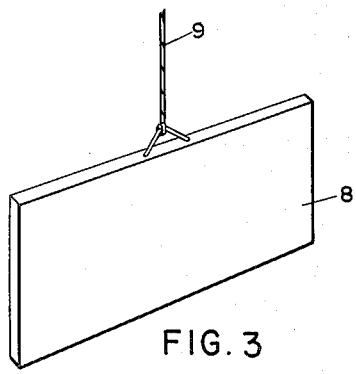
Figure 3 is an isometric view of a partition member used in the silo.

A movable partition member 8 is placed within storage chamber 4 and serves to cleave silage as it is placed within the silo into separate masses thus preventing entwining of the long fibres of one mass of silage with long fibers of an adjacent mass and cohesion of the whole mass of the silage. This partition member 8, as shown in Figures 1, 3 and 7, possesses a length substantially equal to the inner diameter of the storage chamber 4 and is attached to a cable 9 which passes over a pulley 10 supported adjacent the top of the silo. The cable extends downward adjacent the exterior of the silo and is connected to a windlass 11 to permit partition 8 to be raised and lowered within storage chamber 4.

Figure 6:
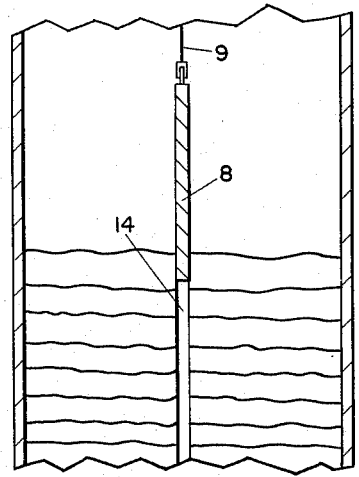
Figure 6 is a sectional view similar to Figure 5 illustrating a further step in the method of filling the silo.

In Figures 5 and 6, I have illustrated the manner in which silage is placed in the silo. The silage is blown in the silo falling therein on opposite sides of partition 8 to form separate masses 12 and 13. As the masses of silage increase in height to a point adjacent the top of partition 8, filling is stopped and the partition 8 is raised by means of windlass 11 to a position shown in Figure 6. It will be noted the masses 12 and 13 are separated by a vertical line of cleavage 14 which forms in effect a "partitionless" partition and prevents entanglement or interlacing of the long fibers of one mass with the long fibers of an adjacent mass. The partition 8 is not raised to a point at which its bottom is above masses 12, 13 to prevent entanglement of silage added to such masses. Silage is again blown in the silo, adding to the separate masses 12, 13 until these masses again increase in height to a point adjacent the top of partition 8. Again, filling is stopped and the partition is raised as described. The process is repeated until the silo is substantially filled. The partition member 8 is suspended adjacent the top of the silo when the silo has been filled or if desired may be removed therefrom. While pressure of silage gradually eliminates the temporary space between the masses formed by member 8, it will be understood the masses 12, 13 remain separated by a definite vertical line of cleavage so that the fibers of the masses are not entangled or interlaced with fibers in an adjacent mass.

Figures 9, 10:
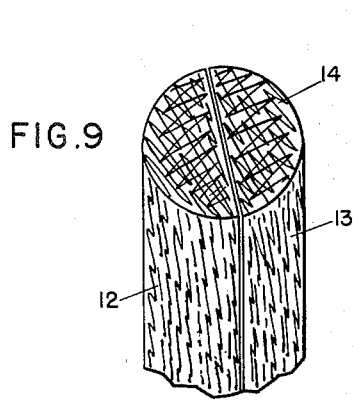
Figure 9 is an isometric view illustrating fragments of the separate masses of silage as they are present in the silo.
Figure 10 is an isometric view similar to Figure 9, illustrating masses of silage separated by the partition member of Figure 4.

Use of partition member 8 in the manner described forms the silage into segments separated by a definite vertical line of demarcation and prevents entwining of the long fibers of one segment with fibers in an adjacent segment. Thus, as the lower portion of each segment is consumed by the feeding animals, the remainder of the segment automatically moves downward and splits across the edge of the divider to replenish the consumed portion without interference with adjacent segments or obstruction by the adjacent segments. In Figures 9 and 10, I have shown portions of these segments 12, 13 as they are formed when the silo is filled. It will be noted segments 12, 13 are separate and are cleaved cleanly and sharply so that gravity movement of any segment is permitted without interference by the adjacent segment.

The splines 7 support these segments thereby preventing compaction and reducing substantially, if not eliminating, wastage as well as preventing abrupt downward fall thereof which might injure the feeding animals and directing the downward moving segment inwardly toward the divider. The divider directs the segment outwardly within easy reach of the feeding animals to replenish the consumed portions of the silage.

Figure 4:
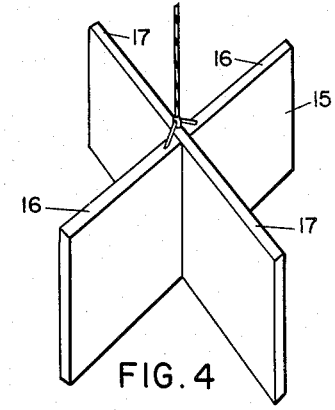
Figure 4 is an isometric view of a modified partition member.

In Figure 4, there is shown a modified partition member 15. Member 15 is in the form of a cross such as a Greek or St. Andrews cross. The arms 16, 17 of the cross, preferably, are of a length substantially equal to the diameter of the storage chamber. It will be appreciated the partition member may have any desired number of arms.

In Figures 2 and 8, I have illustrated a tower type silo. The silo includes a floor 20, a cylindrical base portion 23 and a cylindrical storage chamber 24. Base 3 is provided with openings 25 to permit feeding animals access to the stored silage. A cone-shaped dividing member 26 directs silage toward the openings.

A movable partition member 28 is placed within storage chamber 24 to divide silage into separate masses thus preventing interlacing of fibers in one mass with fibers in an adjacent mass. Partition member 28 includes a central tube 29 having extended vanes 30 connected thereto. The tube may be capped as shown at 31 to prevent silage being blown therein. The vanes 30 need not extend to substantially the inner wall of chamber in this construction since I have found the lines of cleavage formed by the tube and the shorter vanes are adequate to permit automatic feeding of silage.

Cable 32 is attached to tube 29 and windlass 33 to permit movement of the tube and vanes. The storage chamber 24 may be filled with silage as described above.

In this construction, splines 34 preferably extend about the circumference of the tower, as best shown in Figure 8. These splines 34 may extend into the storage chamber at a place adjacent the apex of the cone divider 26 if desired and provide additional support for the silage masses to prevent wastage.

The feeding openings in the silos shown may be closed by bulkheads when the silo is used merely for storage purposes. These bulkheads may be held in desired position by means of spaced stanchions. When it is desired to use the silo for automatic feeding, the stanchions are removed to permit removal of the bulkheads. If desired, the stanchions may then be replaced in position spaced from one another to permit automatic supply of foodstuffs to the animal while preventing the animal from entering the silo.

In Figures 11, 12 and 13, I have shown a silo embodying a modification in the silage flow control means. There is shown a silo comprising a plurality of cylindrical metal sections 50 which are disposed one on top of the other and secured together at joints 51. The usual roof closes the top of the silo.

The series of cylindrical metal sections 50 are spaced upwardly from the foundation 52 so that the cattle may feed out of the bottom of the structure and are supported by a plurality of circumferentially spaced posts 53 which rest on the outer annular portion of foundation 52.

Posts 53 are spaced outwardly of sections 50 and are connected to the lowermost of sections 50 by a plurality of generally straight connecting segments 54 which extend between adjacent posts 53 and are attached to an angle-shaped ring 55 which is secured to the outer surface of the lowermost sections 50.

Each of the segments 54 consists of a pair of radially extending angle-shaped end plates 56 which are connected by an I-beam 57. End plates 56 rest on the flanged upper end of posts 53 and the end plates of each segment are disposed in a back-to-back relation with the end plates of adjacent segments and secured thereto by bolts 58. Additional attachment between adjacent segments 54 is provided by tie plates 59 which connect the I-beams 57 of the adjacent segments.

To connect segments 54 to ring 55 the lower flange of ring 55 is secured by suitable bolts to a series of plates which extend between end plates 56 of each segment inwardly of I-beams 57. Added support may be given to these plates by vertical ribs.

The lower flange of each post 53 is bolted to foundation 52. Posts 53 thus rigidly support the silo on foundation 52 and sufficient space is available between the posts for livestock to feed from the silage stored in the structure. Foundation 52, which if of concrete or the like, normally has the top of the outer annular portion to which posts 53 are secured at grade level and of a diameter greater than that of the silo. However, the central portion of the foundation that lies under the silo proper and on which the silage rests, is of substantially the same diameter as that of the silo. The central portion of the foundation is of a height sufficient to make it comfortable for cattle to remove silage from the top surface thereof which, under the provisions of the structure of this invention, will permit a uniform downward flow of silage from the silo.

As previously explained, in order to control this downward movement of the silage or other stored material, the lower end of the storage structure is provided with a plurality of circumferentially spaced control or brake means. As shown in Figures 11 and 12, posts 53 are secured at the lower ends of the foundation as previously described, and at the upper end are bolted to the annular right angle-shaped ring 55 in turn suitably secured to the cylindrical wall of the silo at spaced intervals around the structure. Control members, such as screws or bolts 61, are threaded through bearing members 62 secured to ring 55 and extend to the upstanding flange of ring 55 and the wall of the silo into engagement with the material which may be stored in the structure.

The inner ends of screws 61 are provided with sharp points while the outer ends are preferably shaped to receive a wrench for turning the screws or bolts into or out of their threaded bearings 62. The screws are preferably of substantial diameter in length because, first, of the necessity of withstanding substantial pressure from the silage and secondly, because it is desirable that the bolts or screws be capable of being fed inwardly into the mass of silage for a substantial distance.

In the event that the column of silage feeds downwardly too rapidly at any particular spot or spots, the screws or bolts which are disposed adjacent these positions may be fed inwardly into the column of silage. The flow of the descending silage will be retarded, not only by the bolts which extend into the silage, but also by the fact that the silage will tend to build up on the bolts thereby causing further retardation to movement of the column.

On the other hand if the rate of flow of the silage becomes too slow at any particular spot or spots, the bolts may be fed outwardly to decrease resistance to movement of the column. The bolts may also be used to shift the movement of the column of the silage.

When the silo is being filled with forage crops, the bolts are fed inwardly as far as possible. Also during filling, the lower portion of the structure inside posts 53 may be closed with panels. The stored material is thus kept in a substantially air tight silo until it is desired to feed out of the silo in order to better preserve the silage or whatever material it may be. When feeding from the structure begins, the panels are first removed and the cattle to be fed are permitted to eat from the lower part of the column of silage.

Observation of the movement of the column around the circumference thereof will indicate whether the column is travelling downwardly too fast in any particular place or places. If this happens, the bolts adjacent these spots are adjusted inwardly to retard movement as desired. Likewise, if observation indicates that the downwardly moving column is compacting in any particular place or places, the bolts may be manipulated to shift the column so that a free flow may be obtained.

The present invention provides a storage structure for animal foodstuffs which assures automatic movement of foodstuffs within easy reach of the feeding animals as the supply of available foodstuffs is consumed. The invention is particularly adaptable to self-feeding silos or barns and packs the heavy, cohesive foodstuffs in such manner within the storage chamber that segments of the mass are free to move downward within the storage chamber without interference by adjacent segments. The silage in a silo is packed in separate cleaved portions permitting ready movement of any portion without danger of injury to a feeding animal. The present invention renders self-feeding silos practicable since it assures automatic downward movement of the heavy, cohesive mass as required by the feeding animals.

The invention provides a relatively simple and economical way to control the flow of silage in a self-feeding silo and the means provided to accomplish the desired purposes may be easily and quickly manipulated by an operator from ground level.

While I have described a preferred embodiment of the invention, it will be understood that the invention is not limited thereto since it may be otherwise embodied within the scope of the following claims.

I claim:

1. A storage structure for the storage of forage crops from which animals may self-feed which comprises a vertically disposed silo having the bottom thereof adapted to be open to permit animals to feed from the corps stored therein, a foundation for said silo, a plurality of circumferentially spaced supports disposed between the open end of the silo and the foundation and secured to the lower end of the silo and to the foundation, circumferentially spaced nuts secured to the lower portion of the silo and to said supports, and a threaded bolt having a pointed end threaded through each nut and adjustably extending through circumferentially spaced openings in said silo, said bolts being adapted to variably pierce the column of silage with the load of the silage taken by said bolts being transmitted to the supports to regulate the downward flow of various vertical portions of the silage from the silo to the foundation and maintain a vertical column of silage with respect to the foundation.

2. A storage structure for the storage of forage crops from which animals may self-feed comprising a silo portion with an open bottom and supporting means operatively connected to the silo portion, and supporting, peripherally spaced spline-like members extending through the structure adjacent the juncture of the silo portion and the supporting means.

3. A storage structure according to claim 2 in which a dividing member is provided in the structure to direct silage toward feeding openings.

4. A storage structure according to claim 2 in which the dividing member is conical.

References Cited in the file of this patent

UNITED STATES PATENTS

| | | |
|---|---|---|
| 682,243 | Cuscaden et al. | Sept. 10, 1901 |
| 1,019,734 | Ellis | Mar. 5, 1912 |
| 1,058,796 | Schott | Apr. 15, 1913 |
| 1,120,178 | Berghofer | Dec. 8, 1914 |
| 1,167,871 | Adams | Jan. 11, 1916 |
| 1,169,322 | Delbruck | Jan. 25, 1916 |
| 1,442,820 | Percy | Jan. 23, 1923 |
| 1,693,612 | Mabee | Dec. 4, 1928 |
| 2,638,871 | Ruedemann | May 19, 1953 |
| 2,691,959 | Dueringer et al. | Oct. 19, 1954 |

FOREIGN PATENTS

| | | |
|---|---|---|
| 37,361 | Denmark | Apr. 19, 1927 |